US008093324B2

(12) United States Patent
Flanigan et al.

(10) Patent No.: US 8,093,324 B2
(45) Date of Patent: Jan. 10, 2012

(54) SOY-BASED RUBBER COMPOSITION AND METHODS OF MANUFACTURE AND USE

(75) Inventors: Cynthia Mowery Flanigan, Canton, MI (US); Deborah Frances Mielewski, Ann Arbor, MI (US); Christine Perry, Kingsport, TN (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/787,586

(22) Filed: May 26, 2010

(65) Prior Publication Data

US 2011/0144261 A1 Jun. 16, 2011

(51) Int. Cl.
*C08K 5/09* (2006.01)
*C08J 3/00* (2006.01)
(52) U.S. Cl. ........................................ 524/322; 524/522
(58) Field of Classification Search .................... 524/322
See application file for complete search history.

(56) References Cited

U.S. PATENT DOCUMENTS

| 3,682,646 | A | 8/1972 | De Paolis et al. |
| 5,667,885 | A | 9/1997 | Nguyen et al. |
| 2005/0282921 | A1 * | 12/2005 | Flanigan et al. ................. 521/99 |
| 2006/0094800 | A1 | 5/2006 | Jong |
| 2008/0004376 | A1 | 1/2008 | Jong |
| 2008/0108733 | A1 * | 5/2008 | Colvin et al. ................... 524/25 |

FOREIGN PATENT DOCUMENTS

JP 2007031572 A * 2/2007

OTHER PUBLICATIONS

Translation of JP 2007-031572, Feb. 2007.*
Vincent, Jennifer, Soy-Based Products Used in More Deere, Ford Gear, www.Michigan Farmer.com, Apr. 2008, pp. 1.
http://www.ussda.gov/oce/reports/energy/biobasedreports2008, United States Department of Agriculture, U.S. Biobased Products Market Potential and Projections Through 2025, OCE-2008-1, Feb. 2008, pp. 96-111.
http://media.ford.com/article_display.cfm?article_id=31382, Cynthia Flanigan: Ford Scientist Returns to Henry Ford's Initiatives With New Soy-Lutions, pp. 1-6.

* cited by examiner

*Primary Examiner* — Ling Choi
*Assistant Examiner* — Hui Chin
(74) *Attorney, Agent, or Firm* — Brooks Kushman P.C.

(57) ABSTRACT

In at least one embodiment, a composition includes a thermoplastic resin and a softened rubber. The rubber ranges from 5 wt. % to 75 wt. % of the resin. The softened synthetic rubber comprises a rubber, a paraffinic oil, and a fatty-acid-containing material. The paraffinic oil ranges from 15 wt. % to 40 wt. % of the rubber. The fatty-acid-containing material ranges from 5 wt. % to 16 wt. % of the weight of the rubber.

20 Claims, 4 Drawing Sheets

SOY-BASED RUBBER COMPOSITION AND METHODS OF MANUFACTURE AND USE

BACKGROUND

1. Technical Field

The present disclosure relates to soy-based rubber composition and its methods of manufacture and use.

2. Background Art

Thermoplastic polymers (TPs), such as thermoplastic polyolefins (TPOs), thermoplastic vulcanizates (TPVs), and thermoplastic elastomers (TPEs), are frequently used plastics in many applications, including automobiles and other vehicles. TPs may be modified with rubber materials so that vehicle components molded from the TPs exhibit performance characteristics such as ductile behavior during impact instead of brittle fracture. Component manufacturers desire to incorporate increased amounts of rubber into TPs. But, the cost of the rubber discourages use of sufficient rubber to achieve desired enhanced performance and processing properties, especially increased elongation properties.

Incorporating rubber materials into TPs often uses paraffinic oils, that is, aliphatic oils without functional groups, to form a separate oil phase in the rubber in order to soften the TPs. The softened TPs are more processable, especially when relatively high molecular weight rubber materials are used, such as ethylene propylene diene terpolymer (EPDM).

TPVs exhibit desirable elastomeric physical properties, relative to TPOs with rubber, because the rubber is firmly connected to the amorphous plastic material. In manufacturing TPVs, any free oil and oil rejected from crystallizing plastic material is reabsorbed into the rubber material and the amorphous plastic material.

But, paraffinic oils are derived from petroleum, a raw material known for its price volatility and ultimately limited renewability. What are needed include more renewable and cost effective materials and associated methods for manufacturing processable TPs having performance properties suitable for vehicular panels.

SUMMARY

In at least one embodiment a composition has a thermoplastic resin and a softened rubber where the rubber includes a natural material substituting for petroleum-based paraffinic oil. The composition has similar or better mechanical performance than equivalent a rubber composition using only paraffinic oil. The rubber ranges from 5 wt. % to 75 wt. % of the resin. The softened rubber comprises a rubber, a paraffinic oil, and a fatty acid containing material. The paraffinic oil ranges from 5 wt. % to 40 wt. % of the rubber. The fatty acid containing material ranges from 0.25 wt. % to 16 wt. % of the weight of the rubber.

In another embodiment, a composition has a thermoplastic resin and a rubber including an unsaturated biomaterial. The rubber ranges from 5 wt. % to 75 wt. % of the resin. As an example of the improved mechanical properties of the composition relative to a composition without the unsaturated biomaterial, the composition has a tensile modulus ranging from 0.25 GPa to 1.0 GPa when tested according to ASTM D638.

In another embodiment, a method of making a panel using the composition having "greener" ingredients, includes the steps of blending a rubber polymer, a paraffinic oil, and an unsaturated biomaterial to form a first mixture. The biomaterial comprises from 0.75 wt. % to 16 wt. % of the rubber. The method also includes melt blending a thermoplastic polyolefin resin with the first mixture to form a second mixture. The first mixture comprises 5 wt. % to 30 wt. % of the resin. The method also includes the step of waiting for a resting time period. The next step in the method is injecting the second mixture into a mold. The second mixture is then cooled. The panel is finally demolded.

DETAILED DESCRIPTION

Reference will now be made in detail to compositions, embodiments and methods of the present embodiments known to inventors, at least one of which includes the best mode of practicing the invention presently known. But, it should be understood that the disclosed embodiments are merely exemplary of the invention that may be embodied in various and alternative forms. Therefore, specific details disclosed herein are not to be interpreted as limiting, but merely as a representative basis for any aspect and/or as a representative basis for teaching one skilled in the art.

Except in the operating examples, or where otherwise expressly indicated, all numbers in this description indicating material amounts, reaction conditions, or uses are to be understood as modified by the word "about" in describing the broadest scope. Practice within the numerical limits stated is generally preferred. Also, unless expressly stated to the contrary:

percent and ratio values are by weight;

the term "polymer" includes "oligomer," "copolymer," "dimer," "terpolymer," "tetramer" and the like;

a material group or class described as suitable or preferred for a given purpose in connection with the invention implies any two or more of these materials may be mixed and be equally suitable or preferred;

constituents described in chemical terms refer to the constituents at the time of addition to any combination specified in the description, and does not preclude chemical interactions among mixture constituents once mixed;

an acronym's first definition or other abbreviation applies to all subsequent uses here of the same abbreviation and mutatis mutandis to normal grammatical variations of the initially defined abbreviation; and unless expressly stated to the contrary, measurement of a property is determined by the same technique as previously or later referenced for the same property.

Figure 1:
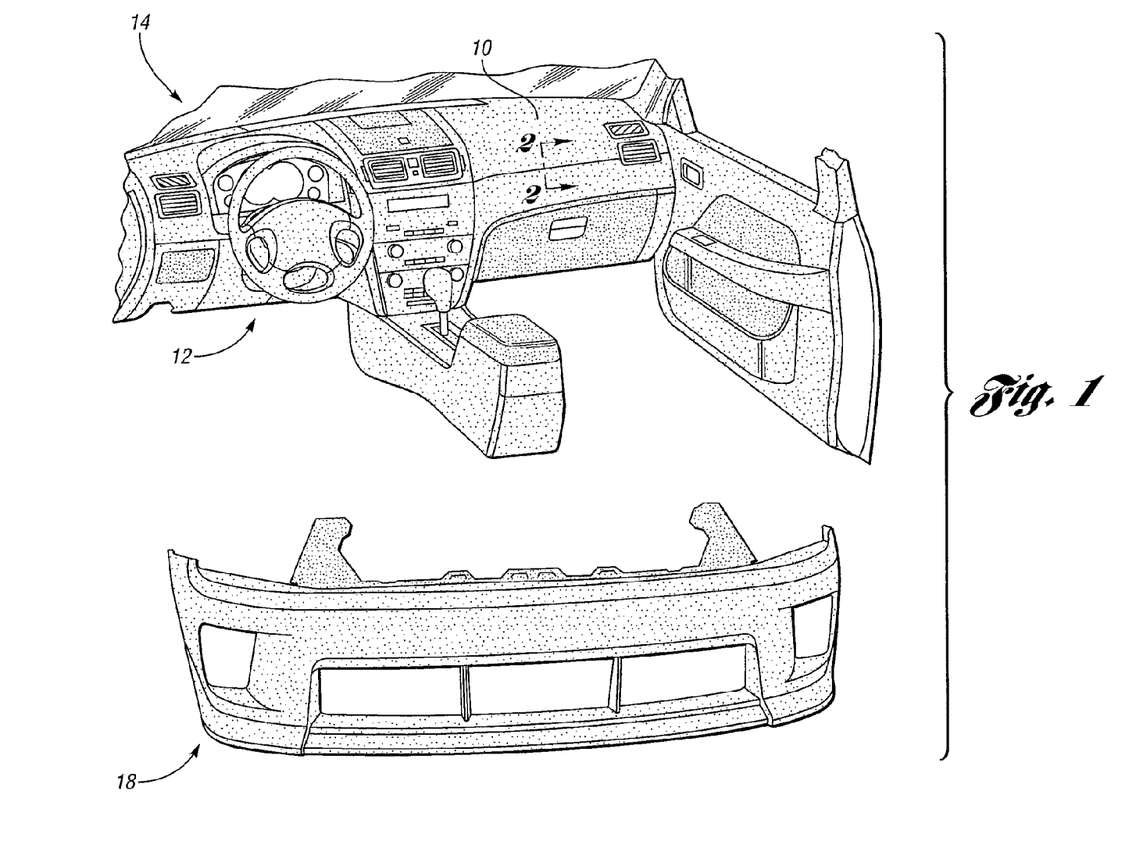
FIG. 1 illustrates vehicular panels and fascia according to at least one embodiment.

In FIG. 1, a vehicular panel 10 such as a dashboard 12 in a vehicle 14 according to at least one embodiment of the present invention is schematically illustrated. Also schematically illustrated in a front fascia 18. It should be understood to while the illustration in FIG. 1 is directed towards the dashboard 12, other interior panels, such as instrument panels, glove box door covers, console sides, console covers, pillow trim panels, shelves, trim covers, air handling vents. Exterior vehicular panels, such as splash guards, bumper fascias, and radiator deflector shields, may also enjoy the benefits of contemplated embodiments.

Such exemplary panels 10, in certain embodiments, are formed from a composition comprising a plastic resin and a modified synthetic rubber, such as softened rubber.

In terms of the materials of the composition, the modified rubber comprises rubber, a paraffinic oil and either a biooil or a biopolyol. The total oil content comprised of the amount of the paraffinic oil, biooil, and biopolyol, in at least one embodiment, ranges from 5 wt. % to 45 wt. % of the rubber content. In another embodiment, the total oil content ranges from 20 wt. % to 45 wt. % of the rubber content. In yet another embodiment, the total oil content ranges from 25 wt. % to 40 wt. % of the rubber content.

The rubber, in least one embodiment, ranges from 5 wt. % to 75 wt. % of the plastic resin content. The rubber, in another embodiment, ranges from 15 wt. % to 50 wt. % of the plastic resin content. In yet another embodiment, the rubber ranges from 20 wt. % to 35 wt. % of the plastic resin content.

The paraffinic oil, in at least one embodiment, ranges from 15 wt. % to 40 wt. % of the rubber content. In another embodiment, the paraffinic oil ranges from 20 wt. % to 35 wt. % of the rubber content. In yet another embodiment, the paraffinic oil ranges from 25 wt. % to 33 wt. % of the rubber content.

In at least one embodiment, the rubber comprises an uncured rubber, a synthetic rubber, a natural rubber, a styrene butadiene rubber (SBR), a butadiene rubber (BR), or combinations thereof. In another embodiment, the rubber comprises a dynamically vulcanized rubber. In yet another embodiment, the rubber comprises an in-situ, dynamically vulcanized rubber. In yet another embodiment, the rubber comprises a portion of the backbone of the plastic resin. Non-limiting examples of embodiments with the rubber incorporated in the backbone of the plastic resin include block copolymers, random block copolymers, and grafted polymers.

The vulcanized rubber may be vulcanized in at least one embodiment, by using a vulcanizing agent, such as a sulfur-based material, such as a disulfide, a dithiocarbamate, or sulfur.

The rubber may be also cured using a peroxide-based catalyst, in at least one embodiment. A peroxide-cured rubber, in certain embodiments, may include a Type II co-agent. The Type II co-agent may include a carbon-carbon double bond or a carbon chain having easily abstractable hydrogen atom. A non-limiting example of the Type II co-agent may include a polyol having at least one double bond in a pendent chain, such as a pendant fatty-acid attached to a triglyceride polymer backbone.

Paraffinic oil includes aliphatic oils, such as a mixture of heavier alkanes. Substantially, paraffinic oils do not include triglyceride in the molecular backbone. Non-limiting examples of paraffinic oil include nujol, adepsine oil, alboline, glymol, medicinal paraffin, kerosene, stove oil, octane, decane, cetane, and saxol. Another example of paraffinic oil is Sunpar® 2280 from Exxon.

Paraffinic oils have the general formula $C_nH_{(n+2)}$, where n may range from 6 to 30, in at least one embodiment. It another embodiment, paraffinic oils may have an "n" ranging from 8 to 26. In yet another embodiment, paraffinic oils have an "n" ranging from 10 to 18.

Paraffinic oil, in at least one embodiment, has a density ranging from 0.75 g/cm$^3$ to 0.85 g/cm$^3$. In other embodiment, paraffinic oil has a density ranging from 0.78 g/cm$^3$ to 0.83 g/cm$^3$.

It is understood that while the specification discloses paraffinic oil, other oils, such as naphthenic oil, aromatic oil, and combinations thereof, including combinations with paraffinic oil may be used without exceeding the scope of contemplated embodiments. It is further understood that paraffinic waxes may be used without exceeding the scope of contemplated embodiments, provided that they can be liquefied, such as by melting or solubilizing in a solvent.

In at least one embodiment, the biooil includes a natural oil having no substantial hydroxyl content. A non-limiting example of the natural oil having no substantial hydroxyl content is a soy oil. In at least one embodiment, the soy oil, derived from a soy bean, includes carbon-carbon double bonds, but no hydroxyl groups, such as a degummed, expeller pressed soybean oil.

In at least one embodiment, the biopolyol includes a polyol derived from a natural oil, such as a hydroxylated natural oil (NOP) or an unsaturated biomaterial. The natural oil may include a triglyceride in the molecular backbone and include unsaturated pendant chains. The polyol, in certain embodiments, a derived from vegetable oils by techniques known in the art. Further, the polyol may contain fatty-acid chains pendent from the triglyceride polymer backbone. Non-limiting examples of the polyol derived from the natural oil having one or more hydroxyl groups in the molecule include hydroxylated versions of soy oil, peanut oil, castor oil, and canola oil.

The biooil and/or biopolyol, in at one embodiment, ranges from 0.25 wt. % to 16 wt. % of the rubber content. The biooil and/or polyol, in another embodiment, ranges from 1 wt. % to 14 wt. % of the rubber content. In yet another embodiment, the biooil and/or polyol ranges from 1.25 wt. % to 13.2 wt. % of the rubber content.

The biooil and/or biopolyol, in at one embodiment, ranges from 5 wt. % to 40 wt. % of the total oil content in the rubber. The polyol, in another embodiment, ranges from 1 wt. % to 10.5 wt. % of the total oil content in the rubber. In yet another embodiment, the polyol ranges from 1.25 wt. % to 9.9 wt. % of the total oil content in the rubber.

In certain embodiments, the polyol is hydroxylated. The hydroxylated polyol may be a natural hydroxylated polyol or a chemically-modified hydroxylated polyol, prepared by methods known in the art, such as blowing the unhydroxylated polyol with a oxygenated gas, or reacting the oil with a peroxy acids to prepare an epoxide which can be reacted with a nucleophile to form one or more hydroxyl groups on the pendant chain.

In another embodiment, the polyol is a hydroxylated, fatty-acid-containing polyol, such as a soy oil that is unsaturated and includes hydroxyl groups. The polyol may have a chemical structure as in [1].

[1]

-continued

The length of the chain, in certain embodiments, may have an "m" ranging from 0 to 26. In another embodiment, the chain may have an "m" ranging from 4 to 18. In yet another embodiment, the chain may have an "m" ranging from 6 to 16.

The length of the chain of the polyol, in certain embodiments, may have a "k" ranging from 0 to 26. In another embodiment, the chain may have a "k" ranging from 4 to 18. In yet another embodiment, the chain may have a "k" ranging from 6 to 16. In certain embodiments, it is preferable that the hydroxyl groups be positioned near the center of the pendent fatty-acid chain.

The average number of hydroxyl groups per polyol molecule, if present, in at least one embodiment, may range from 25 mg KOH/gm to 400 mg KOH/gm when tested according to ASTM D4274. In another embodiment, the average number of hydroxyl groups per molecule may range from 30 mg KOH/gm to 375 mg KOH/gm. In yet another embodiment, the average number of hydroxyl groups per molecule may range from 45 mg KOH/gm to 175 mg KOH/gm.

The average number of hydroxyl groups per polyol molecule, in at least one embodiment, may range from 0 to 6. In another embodiment, the average number of hydroxyl groups per molecule may range from 1 to 4. In yet another embodiment, the average number of hydroxyl groups per molecule may range from 2 to 3.

It is understood that in certain embodiments, the polyol may include contaminants, such as an aldehyde. The contaminants may affect an apparent reactivity of the hydroxylated polyol without exceeding the scope or spirit of the contemplated embodiments.

Useful plastic resins include thermoplastic resins. Non-limiting examples of useful thermoplastic resins are thermoplastic polyurethane resin, thermoplastic olefin resin, polyvinyl chloride resin, polypropylene resin, and combinations thereof. Preferable examples useful resins include, but are not limited to, include a homopolymer and/or a copolymer of polyethylene resin, homopolymer and/or a copolymer of polypropylene resin, a filled polypropylene resin, polycarbonate resin, acrylonitrile butadiene styrene resin, mixed acrylonitrile butadiene styrene and polycarbonate resin, rubber-modified plastic resin, and combinations thereof.

The thermoplastic resin may be filled or unfilled. Excluding any filler material content, the thermoplastic resin may comprise 25 wt. % to 95 wt. % of a composition, according to at least one contemplated embodiment. In another embodiment, the thermoplastic resin, exclusive of any filler material content, may comprise 50 wt. % to 85 wt. % of a composition. In yet another embodiment, the thermoplastic resin may comprise 70 wt. % to 80 wt. % of the composition.

It is understood that the filler material may include one or more inorganic filler, organic filler, or combinations thereof. Non-limiting examples of the organic filler may include a petroleum-based filler, such as carbon black, or a natural filler, such as soy meal, soy protein, or soy flour.

In least one embodiment, the vehicular panel 10 includes the thermoplastic resin blended with the synthetic rubber and is formed by a molding process, such as injection molding. The vehicular panel 10 may have any suitable thickness and density. For example, vehicular panel 10 may have an average thickness in the range of 0.1 to 15 mm and a density in the range of 0.65 to 2.0 g/cm$^3$. In at least one embodiment, vehicular panel 10 has an average thickness in the range of 0.5 to 10 mm and a density in the range of 0.75 to 1.20 g/g/cm$^3$. It should be understood, however, that vehicular panel 10 may have varying thicknesses throughout its layer.

Figure 2:
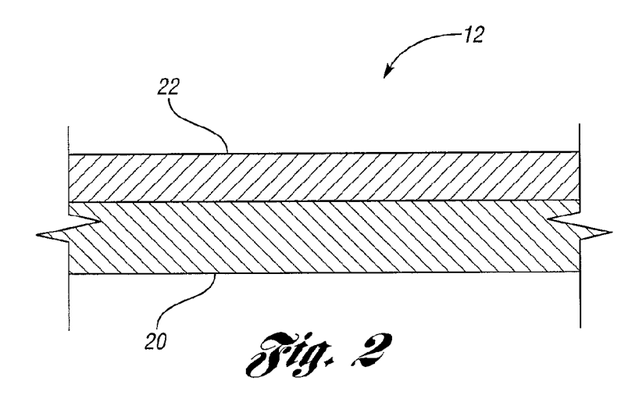
FIG. 2 illustrates a cross-section of a vehicular panel along axis 2-2 of FIG. 1 according to at least one embodiment.

Turning now to FIG. 2, at least in certain embodiments, the dashboard 12 includes a substrate 20 made of a relatively hard plastic material and an optional cover skin 22 made of a relatively softer material that covers a substantial portion of the substrate 20 as viewed along axis 2-2 illustrated in FIG. 1. Either the substrate 20 or the cover skin 22 can be made of the composition.

In at least one embodiment, the substrate 20 has an average thickness ranging from 0.1 mm to 15 mm. In another embodiment, the substrate 20 has an average thickness ranging from 0.5 mm to 10 mm. In yet another embodiment, the substrate 20 ranges in thickness from 1 mm to 5 mm.

In terms of mechanical properties, the composition may have equivalent or improved properties relative to comparative compositions using only 100% paraffinic oil. In certain embodiments, a test plaque of the composition has a percentage elongation at yield ranging from 10% to 25% when measured at room temperature (22° C.) according to ASTM D638 at a 50 mm/min extension rate. In other embodiments, the test plaque has a percentage elongation at yield ranging from 12% to 22%. In yet other embodiments, the test plaque has a percentage elongation at yield ranging from 14% to 20%. It is understood that while these performance properties describe test plaque samples, the same performance properties are suitable for vehicular panel 10, substrate 20, and/or cover skin 22.

In certain embodiments, the test plaque has a tensile modulus ranging from 0.25 GPa to 0.75 GPa when measured at room temperature according to ASTM D638 at a 50 mm/min extension rate. In other embodiments, the test plaque has a tensile modulus ranging from 0.32 GPa to 0.75 GPa. In yet other embodiments, the test panel may have a tensile modulus ranging from 0.4 GPa to 0.65 GPa.

In certain embodiments, the test plaque has a percentage elongation at yield ranging from 10% to 25% while at the same time retaining a tensile modulus ranging from 0.25 GPa to 1 GPa when measured at room temperature according to ASTM D638 at a 50 mm/min extension rate. In other embodiments, the test plaque has a percentage elongation at yield ranging from 12% to 22% at the same time retaining a tensile modulus ranging from 0.32 GPa to 0.75 GPa. In yet other embodiments, the test plaque has a percentage elongation at yield ranging from 14% to 20% at the same time retaining a tensile modulus ranging from 0.4 GPa to 0.65 GPa.

In certain embodiments, the test plaque has a tensile modulus ranging from 0.1 GPa to 0.4 GPa when measured at an elevated temperature of 80° C. according to ASTM D638 at a 50 mm/min extension rate. In other embodiments, the test plaque may have a tensile modulus ranging from 0.13 GPa to 0.3 GPa at an elevated temperature of 80° C. In yet other embodiments, test plaque may have a tensile modulus ranging from 0.16 GPa to 0.26 GPa at an elevated temperature of 80° C.

In certain embodiments, the test plaque may have a percentage elongation at yield ranging from 10% to 25% when measured at the elevated temperature (80° C.) according to ASTM D638 at a 50 mm/min extension rate. In other embodiments, the test plaque may have a percentage elongation at yield ranging from 12% to 22% at an elevated temperature of 80° C. In yet other embodiments, the test plaque may have a percentage elongation at yield ranging from 14% to 20% at an elevated temperature of 80° C.

In certain embodiments, the test plaque has a tensile strength greater than 5 MPa when measured at room temperature according to ASTM D638 at a 50 mm/min extension rate. In other embodiments, the test plaque has a tensile strength ranging from 10 MPa to 40 MPa. In yet other embodiments, the test plaque has a tensile strength ranging from 15 MPa to 35 MPa.

In certain embodiments, the test plaque may have an energy absorption ranging from 0.2 J to 0.8 J when measured at the room temperature (22° C.) according to ASTM D3763. In other embodiments, the test plaque may have an energy absorption ranging from 0.30 J to 0.65 J. In yet other embodiments, the test plaque may have an energy absorption ranging from 0.35 J to 0.60 J.

In certain embodiments, the test plaque may have a water absorption less than 0.085 wt. % when measured after 24 hr of submersion according to ASTM D570. In other embodiments, the test plaque may have a water absorption ranging from 0 wt. % to 0.080 wt. %. In yet other embodiments, the test plaque may have a water absorption ranging from 0.01 wt. % to 0.075 wt. %.

Figure 3:
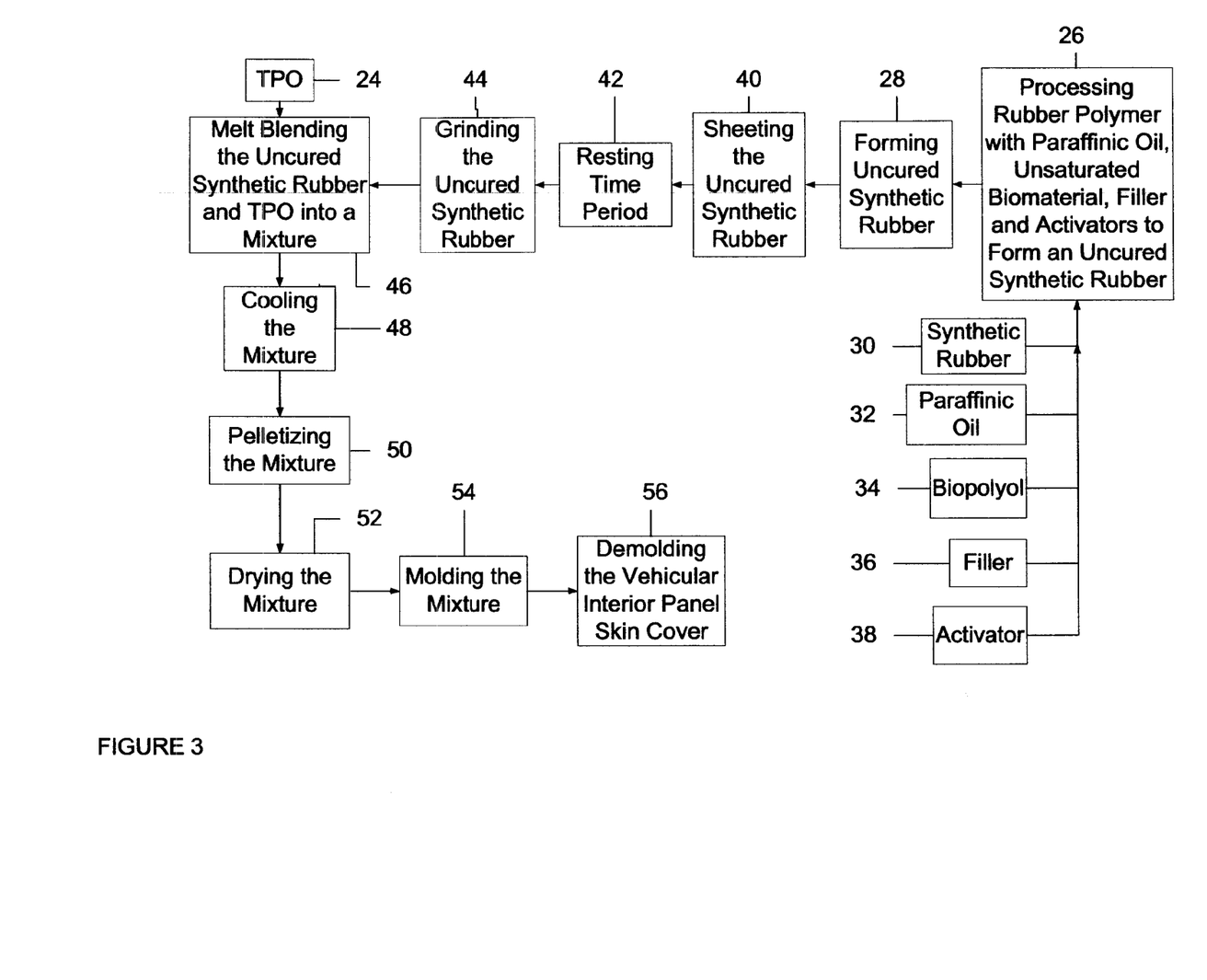
FIG. 3 shows a process flow diagram for preparation of a vehicular panel according to at least one embodiment.

Turning now to FIG. 3, an exemplary process for preparation of vehicular panel 10 in at least one embodiment, is schematically illustrated. In an embodiment of mixing process step 26, an uncured synthetic rubber mixture 28 is formed when the synthetic rubber 30 is mixed in a Banbury mixer with the paraffinic oil 32, and a biomaterial, such as a biopolyol, such as the hydroxylated, fatty-acid-containing polyol 34, the filler 36, and at least one activator 38. The mixture 28 is further homogenized and sheeted using a two-roll mill in a sheeting step 40, in at least one embodiment.

After sheeting step 40, mixture 28 is held for a resting time period 42. The resting time period 42, in at least one embodiment exceeds 24 hours. The resting time period 42, in at least one other embodiment, ranges from 24 hours to 72 hours.

After the resting time period 42, the mixture 28 is ground to a relatively average smaller particle size in a grinding step 44 in at least one embodiment. In at least one embodiment, the particle size ranges from 0.2 cm to 5 cm. In another embodiment, the particle size ranges from 0.5 cm to 2 cm.

After the grinding step 44, the rubber in at least one embodiment, is blended with a thermoplastic polyolefin, from a TPO source 24, in a screw extruder to form a TPO-rubber mixture in a blending step 46. In at least one embodiment, the thermoplastic polyolefin comprises approximately 67 wt. % of the TPO-rubber mixture and the uncured synthetic rubber 28 comprises approximately 33 wt. % of the TPO-rubber mixture excluding any filler 36. In another embodiment, the thermoplastic polyolefin ranges from 60 wt. % to 85 wt. % of the TPO-rubber mixture and the synthetic rubber 28 ranges from 15 wt. % to 40 wt. % of the TPO-rubber mixture. In yet another embodiment, the thermoplastic polyolefin ranges from 65 wt. % to 75 wt. % of the TPO-rubber mixture and the synthetic rubber 28 ranges from 25 wt. % to 35 wt. % of the TPO-rubber mixture.

In at least one embodiment of the TPO-rubber mixture, the TPO is a polypropylene. In at least one embodiment, the polypropylene includes a crystalline polypropylene or a semi-crystalline polypropylene. In yet another embodiment, the polypropylene includes a syntactic propylene or an isotactic polypropylene.

After blending step 46, the TPO-rubber mixture is cooled below the melting point of the mixture to form a solid in a cooling step 48 in certain embodiments. The solid is pelletized in a pelletizing step 50 to form a pelletized solid. The pelletized solid is allowed to dry for a drying time period 52 in certain embodiments. The drying time period 52, in at least one embodiment, exceeds eight hours. In other embodiment, a drying time period 52 ranges from 16 hours to 48 hours.

After drying time period 52, the pelletized solid is shaped to form the vehicular panel 10, substrate 20 or cover skin 22 in a shaping step 54. The shaping step 54, in at least one embodiment, may include a molding step using either a closed mold or an open mold. In another embodiment, the shaping step may include, but is not limited to, an injection molding step, a pressure forming step, a rotomolding step, or a sheeting step.

It is understood that while the shaping step 54 is described as using the pelletized solid, the solid may be prepared in other forms such as a fine powder or a micronized powder without exceeding the scope or spirit of contemplated embodiments. It is further understood that shaping step 54 may include several sub-steps, either having sequential time periods or at least partially overlapping time periods. A non-limiting example of a sequential process includes a sheeting step followed by a vacuum forming step using certain embodiments of the composition. The final step is demolding the vehicular interior panel 10 and/or skin cover 22 in step 56.

Figure 4:
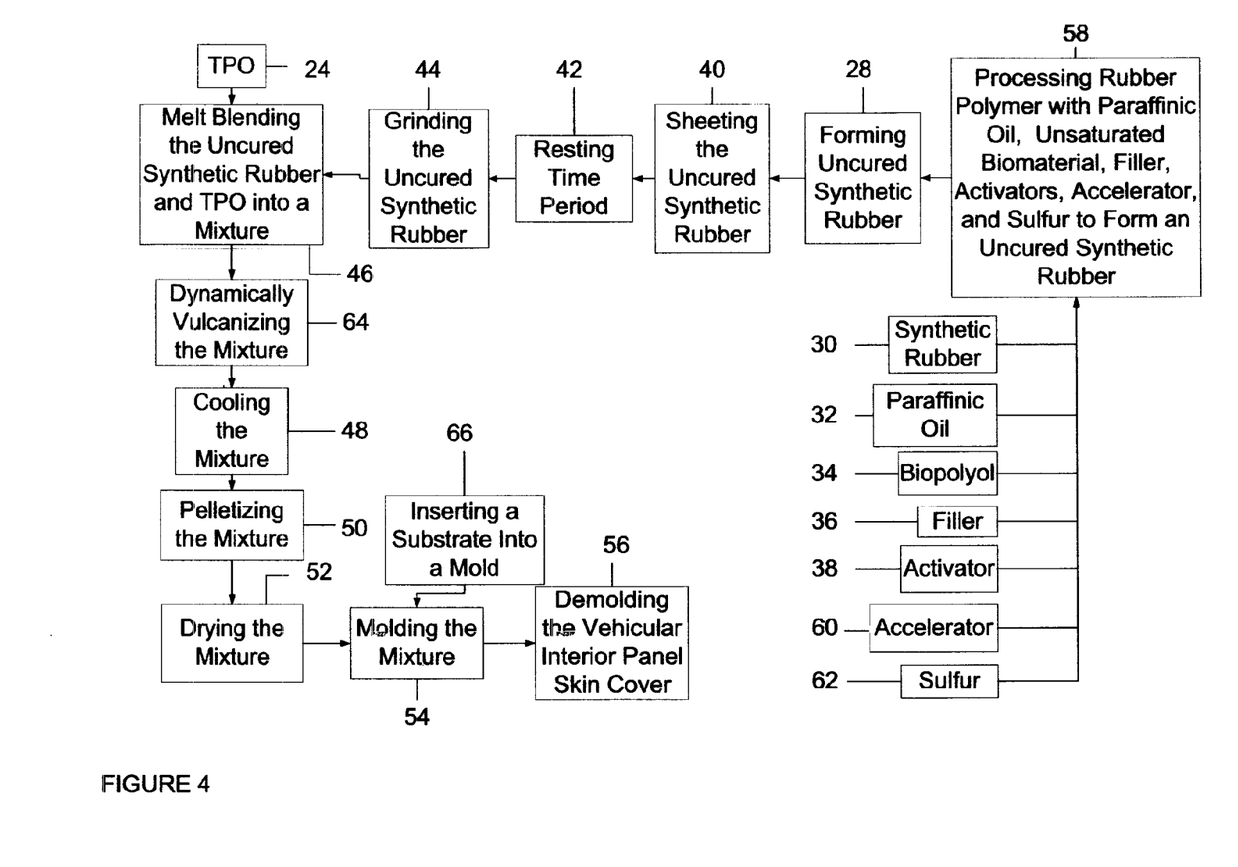
FIG. 4 shows a process flow diagram for preparation of a vehicular panel according to at least one embodiment.

Turning now to FIG. 4, an exemplary process for preparation of the vehicular panel 10 in at least one embodiment, is schematically illustrated. In mixing process step 26, an uncured synthetic rubber mixture 58 is formed when the synthetic rubber 30 is mixed in a Banbury mixer with the paraffinic oil 32, the hydroxylated fatty-acid-containing polyol 34, the filler 36, at least one activator 38, at least one accelerator 60, and a sulfur-containing material 62. The mixture 58 is further homogenized and sheeted using a two-roll mill in a sheeting step 40.

After sheeting step 40, mixture 58 is held for a resting time period 42. The resting time period 42, in at least one embodiment exceeds 24 hours. The resting time period 42, in at least one other embodiment, ranges from 24 hours to 72 hours.

After the resting time period 42, the mixture 58 is ground to a relatively smaller particles size in a grinding step 44. In at least one embodiment, the particle size is less than 1 cm. In another embodiment, the particle size is less than 0.5 cm.

After the grinding step 44, the rubber is blended with a thermoplastic polyolefin in a screw extruder to form a TPO-rubber mixture in a blending step 46. In at least one embodiment, the thermoplastic polyolefin comprises approximately 67 wt. % of the TPO-rubber mixture and the synthetic rubber 28 comprises approximately 33 wt. % of the TPO-rubber mixture excluding any filler 36. In another embodiment, the thermoplastic polyolefin ranges from 60 wt. % to 85 wt. % of the TPO-rubber mixture and the synthetic rubber 28 ranges from 15 wt. % to 40 wt. % of the TPO-rubber mixture. In yet another embodiment, the thermoplastic polyolefin ranges from 65 wt. % to 75 wt. % of the TPO-rubber mixture and the synthetic rubber 28 ranges from 25 wt. % to 35 wt. % of the TPO-rubber mixture.

After blending step 46, the TPO-rubber mixture is dynamically vulcanized in a dynamic vulcanization step 64. After dynamic vulcanization step 64, the TPO-rubber mixture is cooled below the melting point of the mixture to form a solid in a cooling step 48. The solid is pelletized in a pelletizing step 50 to form a pelletized solid. The pelletized solid is allowed to dry for a drying time period 52. The drying time period 52, in at least one embodiment, exceeds eight hours. In other embodiment, a drying time period 52 ranges from 16 hours to 48 hours.

After drying time period 52, the substrate may be inserted into the mold as in step 66. The pelletized solid is shaped to form the vehicular panel 10 in a shaping step 54. The shaping step 54, in at least one embodiment, may include a molding step using either a closed mold or an open mold. In another embodiment, the shaping step may include an injection molding step, a pressure forming step, or a sheeting step.

The panel 10 is demolded from the mold in step 56.

EXAMPLES

Example 1

Five specimens of EPDM rubber are compounded through mixing process step 26, sheeting step 40, and resting time period step 42. The material compositions are found in the Table 1.

TABLE 1

| | | SPECIMENS | | | | |
|---|---|---|---|---|---|---|
| INGREDIENTS | | A | B | C | D | E |
| Rubber | EPDM[1] | 100 | 100 | 100 | 100 | 100 |
| Petroleum Oil | Paraffinic Oil[2] | 30 | 20 | 20 | 20 | 20 |
| Soy Oil or Polyol Component | Non-Functionalized soy oil[3] | / | 10 | / | 23 | / |
| | Functionalized Soy oil[4], 50 mg KOH/g polyol | / | / | 10 | / | / |
| | Functionalized Soy oil[5], 167 mg KOH/g polyol | / | / | / | 10 | / |
| | Functionalized Soy oil[6], 350 mg KOH/g polyol | / | / | / | / | 10 |
| Additives | Zinc Oxide Activator | 5 | 5 | 5 | 5 | 5 |
| | Naugex MBTSW Accelerator | 3 | 3 | 3 | 3 | 3 |
| | Stearic Acid Activator | 1.5 | 1.5 | 1.5 | 1.5 | 1.5 |
| | Butazate Accelerator | 1.8 | 1.8 | 1.8 | 1.8 | 1.8 |
| | Sulfur Vulcanizing Agent | 0.8 | 0.8 | 0.8 | 0.8 | 0.8 |

[1]Supplied by Royalene 512 by Lion Copolymer, LLC (Baton Rouge, LA).
[2]Supplied as Sunpar 2280, by Sunoco (Tulsa, OK).
[3]Supplied as Degummed Expeller Pressed Soy Bean Oil by Thumb Oilseed Producers' Cooperative (Ubly, MI)
[4]Supplied as Soyol R2-052-B Difunctionalized Soy Polyol by Urethane Soy Systems Co. (Volga, SC).
[5]Supplied as Soyol R3-170-E Trifunctionalized Soy Polyol by Urethane Soy Systems Co. (Volga, SC).
[6]Supplied as Agrol Diamond Soy Polyol by Biobased Technologies (Fayetteville, AR).

Example 2

The results of testing for each of the TPOs made by Example 1 formulations are given in Table 2.

TABLE 2

| | ELONGATION % | | TENSILE STRESS | TENSILE MODULUS |
|---|---|---|---|---|
| SPECIMEN | FRESH | AGED | (MPa) | (GPa) |
| A | 14.40 | 15.60 | 22.44 | 0.58 |
| B | 16.01 | 14.92 | 20.64 | 0.47 |
| C | 14.40 | 14.31 | 21.85 | 2.54 |
| D | 15.23 | 14.41 | 21.65 | 0.52 |
| E | 14.07 | 15.84 | 21.74 | 0.57 |

The general assessment is that the substitution of soy oil or soy polyol improves the elongation percentage at yield, while not adversely affecting the tensile stress or tensile modulus of the TPO. The materials may be suitable for use in the vehicular panel where a classical TPO with the paraffinic oil softened EPDM rubber is used.

This is surprising since an EPDM rubber modified with the biooil or biopolyols of Example 1 exhibits substantially more elongation percentage than the 100% paraffinic oil softened EPDM rubber. The use of polyols increase elongation of the EPDM in a range from 50% to 110%. Use of a soy oil increases the EPDM elongation in range 100% to 130%. Increasing the elongation of the rubber may have been expected to decrease the tensile performance properties.

Example 3

The results of testing for each of the TPVs made by Example 1 formulations are given in Table 3.

TABLE 3

| SPECIMEN | ELONGATION % FRESH |
|---|---|
| A | 18.01 |
| B | 15.03 |
| C | 15.16 |
| D | 23.71 |
| E | 18.93 |

As with Example 2, the substitution of soy oil or soy polyol does not significantly adversely affect and can improve the elongation percentage at yield of the TPV. This result, too, is surprising given that, prior to blending with the thermoplastic resin, the oil or polyol-softened EPDM rubber has relatively greater elongation at yield ranging from 10% to 110% relative to 100% paraffinic oil softened EPDM.

Example 4

Figure 5:
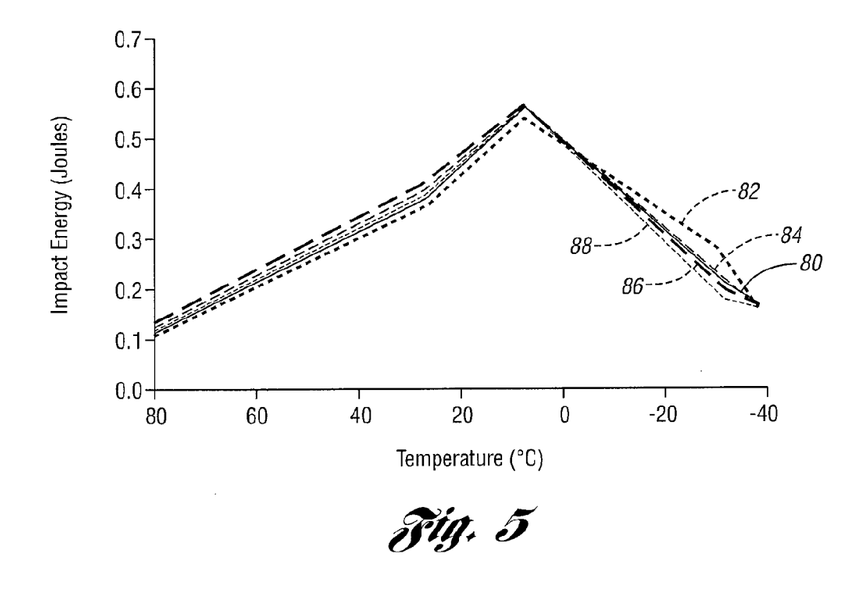
FIG. 5 is a graph of impact energy absorption of specimens prepared according to at least one embodiment.

In regards to FIG. 5, the results of the total energy absorption of impact when measured by the Dynatap method, surprisingly show no significant difference at relatively warm temperatures in impact energy absorption when comparing specimens B-E in TPO with the paraffinic oil softened TPO.

The result, graphed for Specimen A 80, is shown in a graph of impact energy over temperature of the specimen. Specimen B 82, Specimen C 84, Specimen D 86, and Specimen E 88 are shown as well.

At relatively cold temperatures, ranging below 10° C. and as low as −30° C., the soy oil Specimen B 82 surprisingly performed better than the polyol-softened or paraffinic oil softened EPDM in TPO specimens (C-E 84, 86, and 88 and A 80, respectively).

Example 5

The results of soaking in water of Specimens A-E with TPO and A-C made with TPV are given in Table 4.

TABLE 4

| | WATER ABSORPTION % AFTER 24 HOURS | |
|---|---|---|
| SPECIMEN | TPO | TPV |
| A | 9.5 | 8.8 |
| B | 0.0 | 1.5 |
| C | 1.5 | 8.0 |
| D | 2.1 | — |
| E | 0.9 | — |

Surprisingly, the water absorption decreased substantially for all soy oil and polyol softened EPDM specimens used in TPO. But, only the soy oil softened EPDM specimens used in TPV exhibited the same decrease in water absorption. Decreasing water absorption may make the vehicular panels more dimensionally stable in field service where water contacts panels either inadvertently or during field service.

Further, in certain embodiments, such as specimens B-E, the cycle time for molding was surprisingly reduced by up to 50%. While not wishing to be bound by any theory, the presence of unsaturation, such as in the biooil and biopolyol in the rubber appears to have accelerated an injection molding cycle relative to paraffinic oil in the rubber.

In yet other embodiments when soy protein, either as a soy meal or a soy flour, surprisingly, the amount of relatively expensive carbon black used in vehicular panels may be reduced using the soy flour and/or meal with the plastic resin and biomaterial composition.

While certain contemplated embodiments have been illustrated and described, it is not intended that these embodiments illustrate and describe all possible forms of the invention. Rather, the words used in the specification are words of description rather than limitation, and it is understood that various changes may be made without departing from the spirit and scope of contemplated embodiments.

What is claimed:

1. A composition comprising:
   a thermoplastic resin; and
   a softened rubber ranging from 5 wt % to 75 wt % of the resin and comprising a rubber, a paraffinic oil ranging from 5 wt. % to 40 wt % of the rubber; and a fatty-acid-containing material ranging from 0.25 wt. % to 16 wt. % of the weight of the rubber, wherein a ratio by weight of the amount of fatty-acid-containing material to a total amount of paraffinic oil plus fatty-acid-containing material ranges from 0.33 to 0.62.

2. The composition of claim 1, wherein the softened rubber comprises a dynamically vulcanized rubber.

3. The composition of claim 1, wherein the fatty-acid-containing material is a hydroxylated fatty-acid-containing polyol.

4. The composition of claim 3 wherein the polyol has a hydroxyl value ranging from 25 mg KOH/gm to 400 mg KOH/gm when measured according to ASTM D4274.

5. The composition of claim 1, wherein the fatty-acid-containing material comprises a soy polyol.

6. The composition of claim 1, wherein the thermoplastic resin comprises a thermoplastic polyolefin.

7. The composition of claim 1, wherein the rubber comprises ethylene propylene diene terpolymer (EPDM).

8. The composition of claim 1, further comprising a natural filler.

9. A vehicular panel comprising a molded product of the composition of claim 1.

10. The composition of claim 1, wherein the composition has an energy absorption ranging from 0.2 J to 0.8 J when measured according to ASTM D3763.

11. The composition of claim 1, wherein the fatty-acid-containing material includes triglyceride-containing material.

12. The composition of claim 11, wherein the triglyceride-containing material comprises a biooil or a biopolyol.

13. The composition of claim 1, wherein the fatty-acid-containing material ranges from 1.25 wt. % to 13.2 wt. % of the weight of the rubber content.

14. The composition of claim 1, wherein the rubber is a vulcanized rubber.

15. The composition of claim 8, wherein the natural filler is a soy flour or a soy meal.

16. The composition of claim 1, wherein the composition includes an amount of the fatty-acid-containing and the paraffinic oil material effective to reduce water absorption relative to a composition having only the paraffinic oil material.

17. The composition of claim 1, wherein the composition has a percentage elongation at yield ranging from 10% to 25% when measured at room temperature (22° C.) according to ASTM D638 at a 50 mm/min extension rate.

18. The composition of claim 1, wherein the fatty-acid-containing material is present in the rubber in an amount effective to increase the elongation of the rubber in the range of 10% to 110% relative to the same rubber having 100% paraffinic oil.

19. The composition of claim 18, wherein the tensile strength of the rubber including the fatty-acid-containing material decreases less than 8% relative to the same rubber having 100% paraffinic oil.

20. The composition of claim 1, wherein the ratio by weight of the amount of paraffinic oil to the amount of fatty-acid-containing material ranges from 0.61 to 2.

* * * * *